(12) United States Patent
Dieckmann et al.

(10) Patent No.: US 10,469,587 B2
(45) Date of Patent: Nov. 5, 2019

(54) VEHICLE NETWORK AND METHOD FOR ESTABLISHING A VEHICLE NETWORK

(71) Applicant: WABCO GmbH, Hannover (DE)

(72) Inventors: Thomas Dieckmann, Pattensen (DE); Andelko Glavinic, Sarstedt (DE); Sören Hübner, Bockhorn (DE); Sebastian Kühne, Sarstedt (DE); Ulf Laude, Hambühren (DE); Thomas Wolf, Barsinghausen (DE)

(73) Assignee: WABCO GmbH, Hannover (DE)

( * ) Notice: Subject to any disclaimer, the term of this patent is extended or adjusted under 35 U.S.C. 154(b) by 54 days.

(21) Appl. No.: 15/505,470

(22) PCT Filed: Aug. 6, 2015

(86) PCT No.: PCT/EP2015/001625
§ 371 (c)(1),
(2) Date: Feb. 21, 2017

(87) PCT Pub. No.: WO2016/026553
PCT Pub. Date: Feb. 25, 2016

(65) Prior Publication Data
US 2017/0289254 A1    Oct. 5, 2017

(30) Foreign Application Priority Data

Aug. 22, 2014 (DE) .................. 10 2014 012 673

(51) Int. Cl.
*H04L 29/08* (2006.01)
*H04W 12/00* (2009.01)
(Continued)

(52) U.S. Cl.
CPC .......... *H04L 67/12* (2013.01); *H04W 12/003* (2019.01); *H04B 7/15507* (2013.01);
(Continued)

(58) Field of Classification Search
CPC ..... H04L 67/12; H04L 63/18; H04B 7/15507; H04W 4/00; H04W 80/08; H04W 84/18; H04W 84/12; H04W 12/003
See application file for complete search history.

(56) References Cited

U.S. PATENT DOCUMENTS

2003/0157975 A1    8/2003   Kadel et al.
2005/0259598 A1*  11/2005   Griffin .................. B61L 15/00
                                                              370/255
(Continued)

FOREIGN PATENT DOCUMENTS

DE        19830053 C1     11/1999
DE    102007060269 A1      6/2009
(Continued)

OTHER PUBLICATIONS

PCT/EP2015/001625 International Search Report dated Dec. 18, 2015, 6 pages.
(Continued)

*Primary Examiner* — Kwang B Yao
*Assistant Examiner* — Moo Jeong
(74) *Attorney, Agent, or Firm* — Warner Norcross & Judd LLP

(57) ABSTRACT

A vehicle network for a plurality of interconnected vehicles is disclosed. The network is in the form of a WLAN and has at least two access points. The access points are interconnected in a wireless manner, i.e., without using a wired backbone. Each access point uses the same radio network ID, so all access points form only one single visible network for WLAN clients. A method for establishing the vehicle network is also disclosed.

6 Claims, 4 Drawing Sheets

(51) Int. Cl.
*H04W 84/18* (2009.01)
*H04B 7/155* (2006.01)
*H04L 29/06* (2006.01)
*H04W 4/00* (2018.01)
*H04W 84/12* (2009.01)
*H04W 80/08* (2009.01)

(52) U.S. Cl.
CPC ............... *H04L 63/18* (2013.01); *H04W 4/00* (2013.01); *H04W 80/08* (2013.01); *H04W 84/12* (2013.01); *H04W 84/18* (2013.01)

(56) References Cited

U.S. PATENT DOCUMENTS

| | | | |
|---|---|---|---|
| 2010/0085907 A1* | 4/2010 | Yasumoto | H04W 88/04 370/315 |
| 2012/0130902 A1* | 5/2012 | Dingler | G06F 21/35 705/71 |
| 2013/0132541 A1 | 5/2013 | Falk et al. | |
| 2013/0215747 A1 | 8/2013 | Jia et al. | |
| 2015/0271137 A1* | 9/2015 | Seok | H04W 4/70 370/338 |
| 2016/0016596 A1* | 1/2016 | Naylor | B61L 15/0027 709/220 |

FOREIGN PATENT DOCUMENTS

| | | |
|---|---|---|
| DE | 102010033230 A1 | 2/2012 |
| EP | 1337055 A2 | 8/2003 |
| EP | 1914146 A2 | 4/2008 |

OTHER PUBLICATIONS

English language abstract and machine translation for DE19830053 (C1) extracted from http://worldwide.espacenet.com database on Nov. 17, 2016, 10 pages.

English language abstract and machine translation for EP1914146 (A2) extracted from http://worldwide.espacenet.com database on Nov. 17, 2016, 7 pages.

English language abstract and machine translation for DE102007060269 (A1) extracted from http://worldwide.espacenet.com database on Nov. 17, 2016, 13 pages.

Chuko, Calvin, "Create Error-free Intercarriage Connections Automatically," Senior Engineer/Product Marketing, May 27, 2011, 7 pages, Moxa Technologies, Inc., Bera, California, USA.

* cited by examiner

VEHICLE NETWORK AND METHOD FOR ESTABLISHING A VEHICLE NETWORK

CROSS-REFERENCE TO RELATED APPLICATIONS

This application is the National Stage of International Application No. PCT/EP2015/001625, filed on 6 Aug. 2015, which claims priority to and all advantages of German Patent Application No. 10 2014 012 673.0, filed on 22 Aug. 2014, the content of which is hereby incorporated by reference.

FIELD OF THE INVENTION

The invention generally relates to a vehicle network and, more specifically, to a vehicle network for a plurality of vehicles interconnected via a radio link and to a method for establishing the vehicle network. The invention also relates to an electronic control unit for use in the vehicle network.

BACKGROUND OF THE INVENTION

In a typical WLAN radio network according to the IEEE 802.11 standard, a plurality of clients are connected to an access point. Via the access point, the clients can access other devices (also clients) connected to the access point. The access point may, for example, simultaneously establish access to the Internet (WLAN router).

Every participant in the network has its own network address (IP address) and is uniquely identifiable and addressable with this network address. To establish and maintain the wireless connection between the access point and the clients, the access point transmits its radio network identifier (SSID). The clients must log in to the access point with the radio network identifier of the access point and, in the case of an encrypted connection, with a password also.

The use of a WLAN connection for retrieving data present in a vehicle is known. Special interfaces exist for connecting a WLAN network to a data bus (e.g. a CAN bus) of a vehicle. The arrangement of a plurality of access points within a vehicle is also known, wherein the access points are connected in parallel with one another via lines to a server. Users can be connected wirelessly to one of the access points via dedicated clients, see EP 1 337 055 A2.

The connection of stationary WLAN routers via WDS (Wireless Distribution System) is also known, for example the connection of WLAN routers of the Fritz!Box 7170 type from the manufacturer AVM, Berlin, Germany. WDS is a method for addressing in a WLAN. A plurality of access points can also communicate with one another in the same network via WDS.

SUMMARY OF THE INVENTION

The present invention provides a vehicle network with a plurality of interconnected vehicles. A user with a wireless client may be connectable to the network. Similarly, the network is typically capable of accommodating more than two vehicles. The aim is to achieve the highest possible range along the vehicles.

The vehicle network is provided for a plurality of interconnected vehicles, wherein the network is implemented as a WLAN and has at least two access points, wherein the access points are interconnected wirelessly, i.e. without a cable-connected backbone, and wherein the access points in each case use the same radio network identifier and thus form only one single visible network for WLAN clients.

The access points form a common IP address space. Communication between the access points takes place via WDS. There is no need for every access point to be connected to every other access point of the network. Instead, a line topology is also possible, and also a meshed topology through to a fully meshed network comprising access points.

In a road train, a relatively large number of trailer vehicles can be drawn by a tractor unit. The length of the road train may easily exceed the typical radio range of an access point. With the invention, the establishment of a wireless network is possible for road trains of this length also.

In certain embodiments of the invention, at least one WLAN client forms part of the network. Login information of the client is generally forwarded unchanged from access point to access point.

The access points in the network in each case use the same radio network identifier (SSID), despite different network addresses. This enables the simple incorporation of a WLAN client as part of the network. The WLAN client sees only one network and can transfer from one access point to the next. The wireless connection to the network is maintained. The access points exchange the login information of the client with one another. This may involve at least the MAC address of the client. In this way, a driver with his WLAN-enabled terminal device, for example a Smartphone, may be a participant in the network, regardless of his position and distance from a specific vehicle.

In various embodiments, adjacent vehicles of the network are also physically interconnected and can exchange signals via physical lines. Only vehicles that are attached to one another, as in the case of a combined vehicle with two or three vehicles or a road train with three or more vehicles, are normally physically interconnected. In a road train, the end vehicles (first and last vehicle) are physically connected in each case to only one other vehicle, whereas all other vehicles are connected in each case to two other vehicles. Connections typically exist in the form of the usual trailer couplings and additionally via electrical lines and pneumatic lines in vehicles with pneumatic braking systems. Signals can be exchanged from vehicle to vehicle via the electrical and pneumatic lines or other physical lines. These signals may be used, for example to confirm a physical connection of the vehicles.

In certain embodiments of the present invention, an electronic control unit (ECU) is allocated to each access point, wherein data available in the control units are readable via at least one of the access points, for example via each access point.

As a result, the data occurring in the vehicles can be read in a simple manner by a WLAN client. Access points and clients in each case have software programs that are compatible with one another.

The formation and support of a data exchange layer may be desirable, so that the totality of the data of all vehicles can be accessed from each vehicle without proprietary hardware having to be used.

The method according to the invention for establishing the vehicle network comprising at least two access points and one WLAN client, e.g. the vehicle network described above, has the following steps:

a) a WLAN client acquires connection data of a first vehicle (tractor unit) and of a second vehicle (first trailer), b) the client connects to an access point of the second vehicle, c) the client transmits connection data of an access point of the first vehicle to the access point of the second vehicle, so that the access point of the second vehicle can accept the radio network identifier of the access point of the first vehicle and can establish a connection via WDS to the access point of the first vehicle, d) the access point of the second vehicle accepts the radio network identifier of the access point of the first vehicle, connects to the access point of the first vehicle via WDS and thus forms one single network visible to the client with the access point of the first vehicle.

As a result, a wireless vehicle network comprising a WLAN client and two access points is created, wherein the access points are allocated to the vehicles. The WLAN client is generally allocated to a mobile device outside the vehicles. The first vehicle does not have to be the front vehicle the tractor unit of a combined vehicle, although this is typical. In principle, this is the vehicle of which the connection data are first collected and/or of which the radio network identifier is also used by other vehicles.

The access points are designed in such a way and have the hardware and software to communicate via WDS with another access point and also to use data obtained from the client to set up and perform the connection. Accordingly, the client has hardware and software to receive connection data and access data of the access points and forward them to the other access points of the network.

In certain embodiments in which a further vehicle is included in the network, the method may further comprise the following steps:

a) the client connects to an access point of the further vehicle, b) the client transmits connection data to the access point of the further vehicle so that this access point can accept the radio network identifier of the access points of the network and can establish a connection to at least one of the access points of the network via WDS, c) the access point of the further vehicle accepts the radio network identifier of the access points of the network, connects to at least one of the access points via WDS and thus becomes part of the network visible to the client.

A network is created comprising more than two access points with the same radio identifier. The WLAN client can connect to the access points at any location using the common radio network identifier. If the connection exists to an access point outside the first vehicle and if access to the access point of the first vehicle is desired, the connected access point acts as a repeater. The same applies to access points which are located between the access point of the first vehicle and the access point connected to the client. The access points enable a connection between the client and the access point of the first vehicle located outside the normal range of the client. Furthermore, the client can access the data of the other access points and their clients via its (nearest) access point, using the respective different network addresses.

In certain embodiments when the vehicles are also physically interconnected, a check is carried out following the establishment of a WLAN connection between the access points of two vehicles to determine whether signals are also transmittable between the two vehicles via physical lines, and the WLAN connection between the access points is retained only if the check on the transmission of signals via the physical lines is successful. An authorization of the wireless connection is performed via the physical lines. The erroneous formation of a wireless network consisting of vehicles located close to one another, although these vehicles are not attached to one another or are not physically interconnected, can thereby be avoided.

In these or other embodiments, the WLAN client acquires the connection data of a vehicle at least indirectly in a wireless manner, for example via a radio link or optically with a camera. The connection data include, in particular, the radio network identifier (SSID) and information relating to the encryption (network key). Furthermore, a unique identifier, for example a chassis number, a vehicle registration number or the like, may form part of the connection data. Optically readable connection data may be available, for example, as a QR code or barcode on the vehicle. The client may have a camera with image processing for the optical acquisition of the connection data. A readout using radio technologies such as WPS (Wi-Fi Protected Setup), NFC (Near Field Communication), RFID (Radio Frequency Identification), Bluetooth or similar radio technologies is also possible. A transmitter, the connection data of which are readable by a receiver at the client, is then present in the respective vehicle. Accordingly, the client and the transmitter on the vehicle are typically technologically compatible with one another.

In various embodiments, the WLAN client loads the connection data of a vehicle from a server, and the server is accessed using the data previously acquired wirelessly by the WLAN client. In this case, the client is typically connected to the server via an additional wireless connection, for example via a mobile radio link, to a server accessible via the Internet. An additional protection is thereby achievable. The client does not acquire the connection data directly on a vehicle. Instead, the client first reads data on this vehicle, optically or via a radio link, and transmits these data to the server. The latter checks the data, if necessary the authorization of the client, and then transmits the connection data for the respective vehicle and the associated access point back to the client. Different additional conditions, authorizations and restrictions may be stored on the server. For example, a check can be carried out to determine whether the client is allowed to access a specific vehicle, or whether calendar-dependent or time-of-day-dependent authorizations are observed.

The present invention also provides an electronic control unit for a vehicle with an electronic braking system, with an access point allocated to the control unit, wherein the access point can change its radio network identifier and can communicate via WDS with other access points. Electronic control units for electronic braking systems are known, the latter, in particular, in conjunction with pneumatic braking systems. The control units receive data from connected sensors and/or are connected via a data bus system (CAN bus) to other units and devices in the vehicle. A client can access the information present on the control unit via the access point or via a different connected access point.

BRIEF DESCRIPTION OF THE DRAWINGS

The invention is described in greater detail below with reference to the accompanying figure, in which.

DETAILED DESCRIPTION

Figure 1:
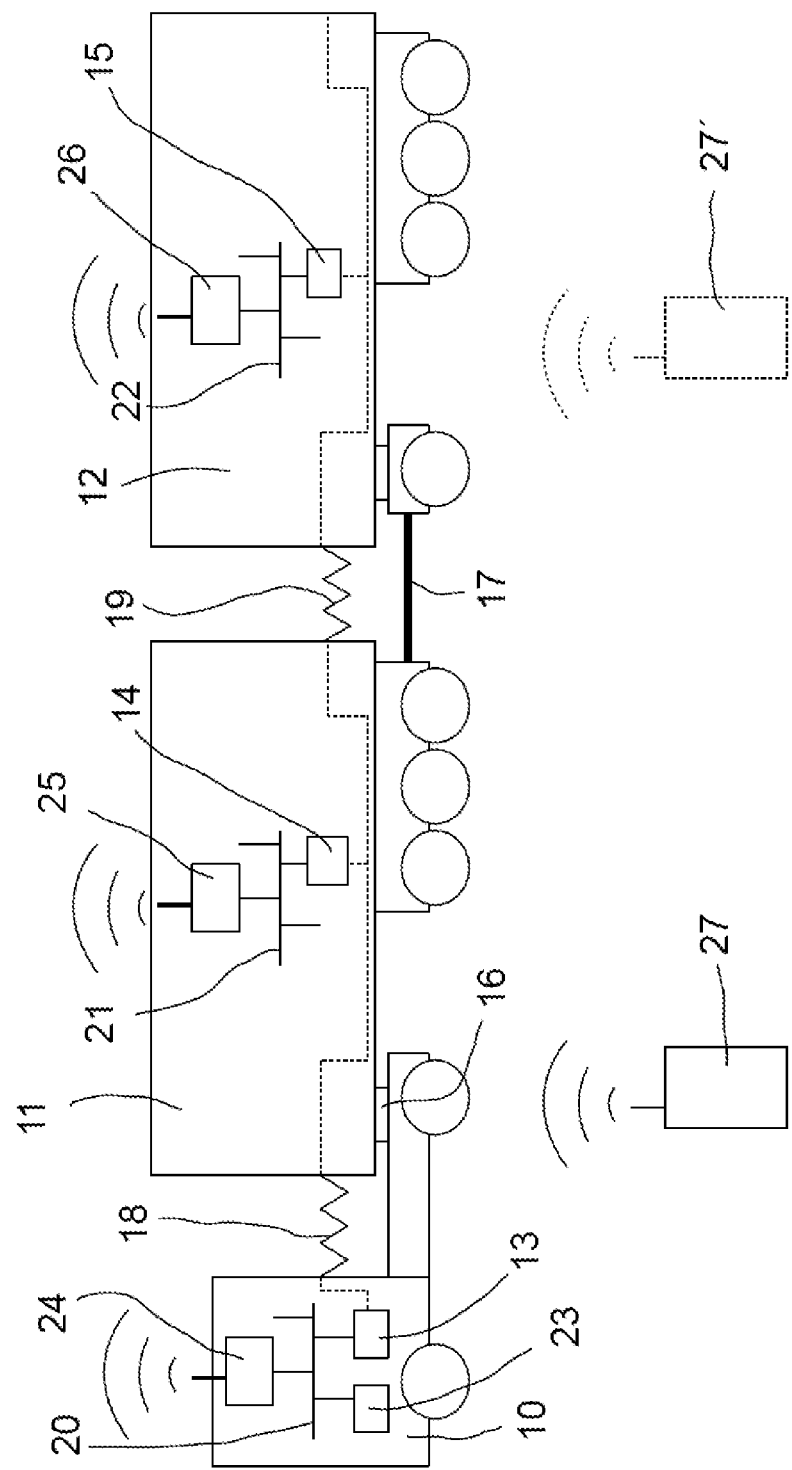
FIG. 1 shows a combined vehicle with a wireless vehicle network.
Figure 2:
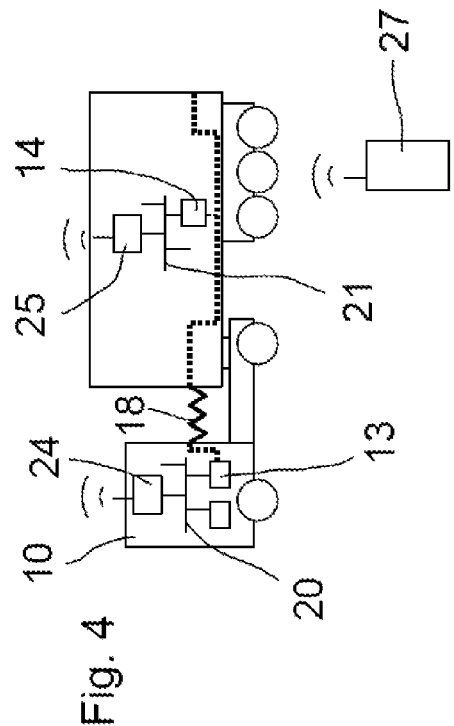
FIGS. 2 to 5 show the sequence for establishing a part of the vehicle network according to FIG. 1.
Figure 3:
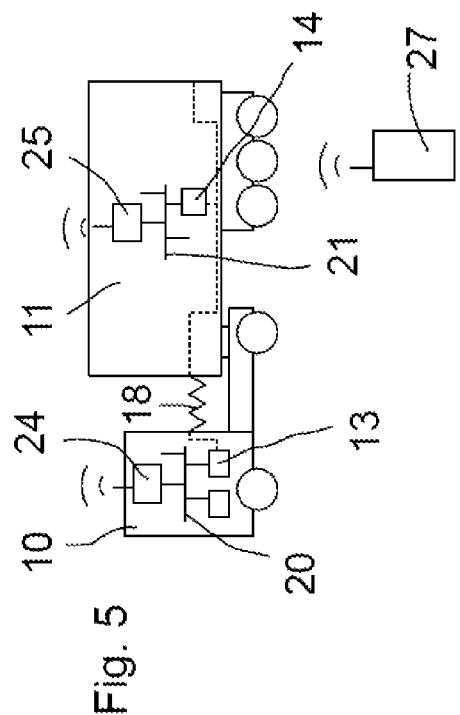

FIG. 1 shows schematically a combined vehicle consisting of a first vehicle/a tractor unit 10, a second vehicle/a first trailer 11 and a third vehicle/a second trailer 12. The first trailer 11 is attached to the tractor unit 10 and the second trailer 12 is attached to the first trailer 11.

The vehicles have an electronic braking system with a pneumatic braking system. A control unit 13, 14, 15 for the electronic braking system is provided accordingly in each vehicle.

In addition to the usual trailer couplings, semitrailers 16 and tow bars 17, physical connections 18, 19 exist between the vehicles. In each case, this involves electrical and pneumatic lines, for example for transmitting pneumatic control pressure, brake light signals and braking commands from the tractor unit 10 to the two trailers 11, 12 and/or a CAN interface according to ISO 111992. The control units 13, 14, 15 can transmit signals to one another directly or indirectly via the connections 18, 19.

In each of the vehicles 10, 11, 12, the relevant control unit 13, 14, 15 is connected to a vehicle-side CAN bus 20, 21, 22, to which further devices are normally connected. In the tractor unit 10, at least an engine control unit 23 and a WLAN unit 24 are also connected to the CAN bus 20. The data available on the CAN bus 20 can be made available via the WLAN unit 24 to a radio network. The WLAN unit 24 may also be integrated into the control unit 13.

In the two trailers 11, 12, WLAN units 25, 26 are similarly connected to the CAN buses 21, 22. Here also, the WLAN units can be integrated into the respective control unit 14, 15. The data present on the CAN buses 21, 22 can be made available via the WLAN units 25, 26 in a radio network.

In principle, each of the WLAN units 24, 25, 26 is active as an access point with its own radio network identifier. In the present case, the WLAN units 25, 26 of the trailers 11, 12 are reconfigured and use the radio network identifier of the WLAN unit 24 of the tractor unit 10. The WLAN units 24, 25, 26 are simultaneously interconnected in a wireless manner, i.e. via WDS (Wireless Distribution System). Messages can thereby be transmitted wirelessly from the WLAN unit 24 via the WLAN unit 25 to the distantly located WLAN unit 26, even if the two WLAN units 24 and 26 are located too far away from one another for an interference-free WLAN transmission. This is the case particularly if further trailers are attached to form a road train and a vehicle network is intended to be established over all vehicles.

A WLAN client 27 can furthermore connect to any of the WLAN units 24, 25, 26 (configured as an access point) and can then move along the vehicles. The WLAN client 27 otherwise always remains connected to the vehicle network. No changeover to different radio network identifiers of access points is required, since, in this case, the WLAN units 24, 25, 26 each use the same radio network identifier as an access point. The movement of the WLAN client 27 from the first trailer 11 to the second trailer 12 is shown in FIG. 1 via the WLAN client 27 drawn at the bottom left with continuous lines and the WLAN client 27' drawn at the bottom right with dotted lines.

The WLAN client 27 is, for example, a Smartphone of a driver. The Smartphone has software for making contact with the WLAN units 24, 25, 26 or with the control units 13, 14, 15, for example in the form of an app supplied by the manufacturer of the control units via the Internet.

The data of the respective vehicle are available at each access point/each WLAN unit 24, 25, 26, at least via the vehicle's own CAN bus 20, 21, 22. The WLAN units operate in each case with the same radio network identifier. However, they have different network addresses (IP addresses), so that the data can be distinguished from vehicle to vehicle. The data can be read from the different vehicles and can be processed with corresponding software on the WLAN client 27. Functions can also be controlled.

Figure 6:
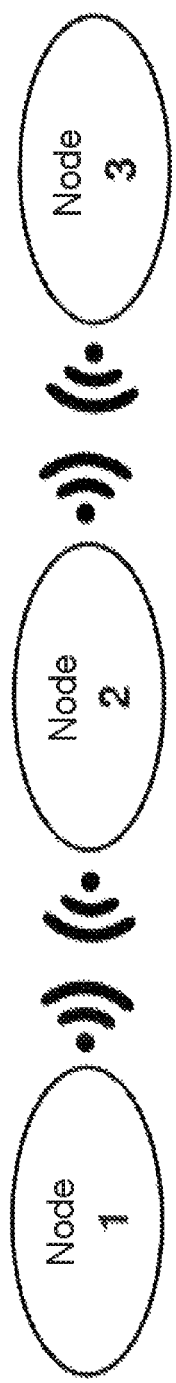
FIG. 6 shows a network with a line topology.

The vehicle network shown essentially has a line-shaped topology without the WLAN client 27, see FIG. 6 with nodes 1, 2, 3 as access points in three interconnected vehicles, e.g. in a motor vehicle with two trailer vehicles. However, the number of vehicles may also be less than the number of nodes/access points. A plurality of access points can thus be present in one vehicle.

Figure 7:
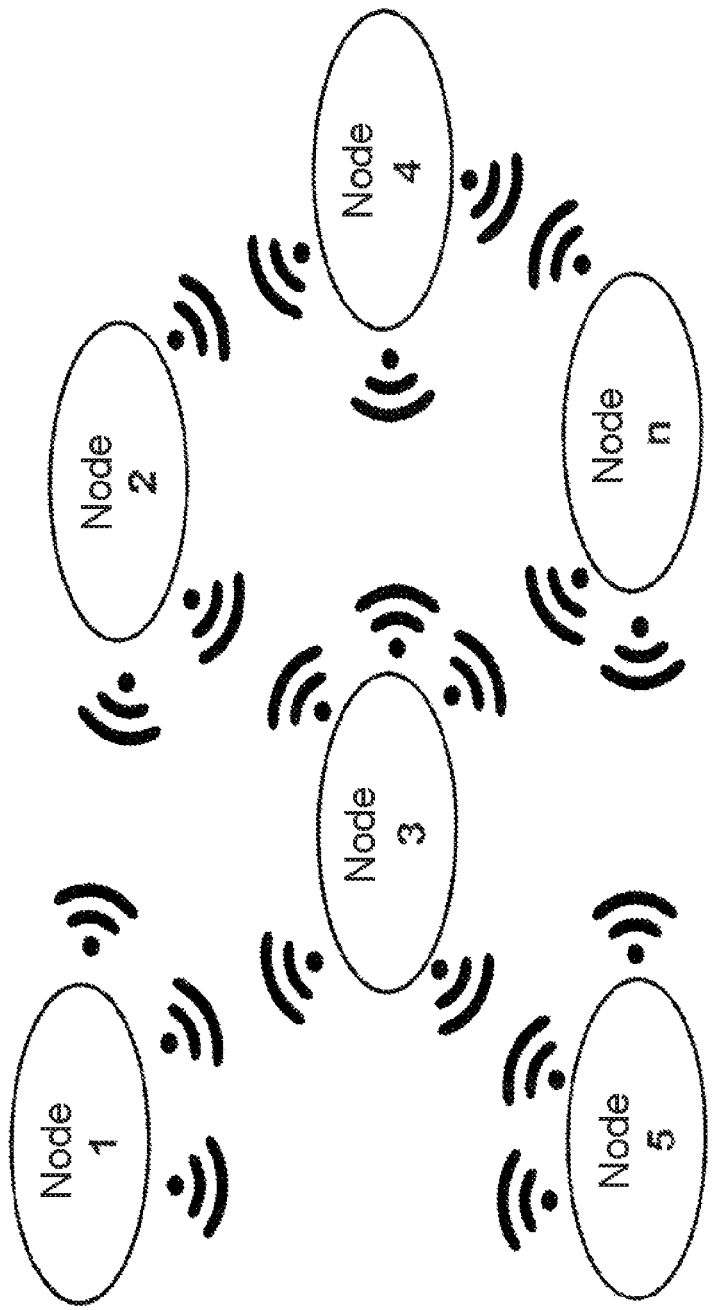
FIG. 7 shows a network with a meshed topology.

Depending on the range of the radio networks formed from the individual WLAN units, overlaps and therefore a meshed topology may be present, see FIG. 7 with 1 to n nodes/access points, through to a fully meshed system. In the latter, every access point communicates directly and without an intermediate station with every other access point of the same network.

The structure of the vehicle network is explained below with reference to FIGS. 2 to 5:

The tractor unit 10 and the first trailer 11 are interconnected as shown in FIG. 1. A driver or other user enters the tractor unit 10 and switches the ignition on there. The electrical systems in the tractor unit 10 and in a physically connected first trailer 11 are thus active.

The WLAN client 27 is a Smartphone with a camera and image-processing software. The WLAN connection data are disposed in each case as a QR code on an outer surface on the tractor unit 10 and on the first trailer 11. The user records the two QR codes (FIG. 2) with the camera of his Smartphone. The WLAN connection data of the tractor unit 10 and the first trailer 11 are thus stored in the Smartphone.

The user establishes a radio connection from the Smartphone to the first trailer 11, i.e. to the WLAN unit 25, and notifies the WLAN unit 25 (FIG. 3) that the latter is to accept the radio network identifier of the tractor unit 10 or the WLAN unit 24. The WLAN of the trailer 11 is then switched off and restarted, now with the same radio network identifier as the tractor unit 10. A temporary vehicle network now exists via the tractor unit 10 and the first trailer 11.

The user requests an authorization via his Smartphone, for example the actuation of the foot brake and/or the release of the hand brake. The user/driver or a third person enters the tractor unit 10 and performs the required action. A modified control pressure and/or a brake light signal are thereby transmitted from the tractor unit 10 to the first trailer 11 (see FIG. 4, bold-printed physical connection 18 with a dotted further connection). The signals are detectable by the control unit 14. The control unit 14 sends the requested confirmation via the WLAN unit 25 to the Smartphone. It is thus ensured that the tractor unit 10 and the first trailer 11 physically coupled to it form parts of the vehicle network. The temporary vehicle network becomes a permanent vehicle network which remains in place until a termination instruction follows and/or the first trailer 11 is disconnected from the tractor unit 10.

Figure 4:
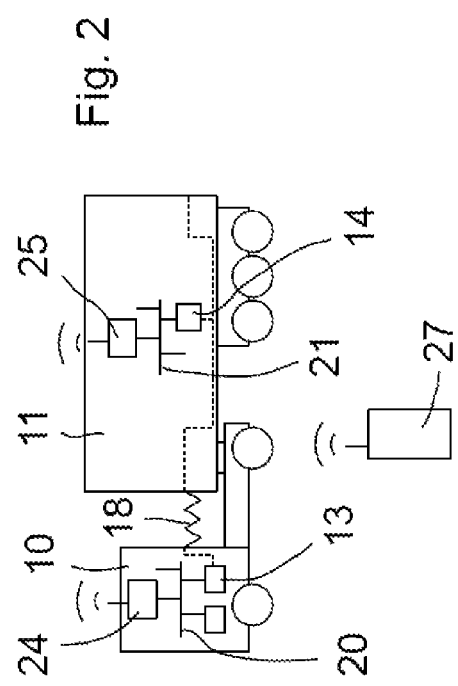

If the confirmation of the physical connection of the tractor unit 10 and the first trailer 11 explained with reference to FIG. 4 fails, the common vehicle network is rejected. A re-establishment is possible. The physical connection between the tractor unit 10 and the trailer 11 should first be checked.

The authorization request to check the physical connection can also be made in an automated manner. Either the driver must be manually active (as described here) or the process of signal generation and subsequent signal checking on the physical connection is similarly performed in an automated manner, for example via software in the access point, the radio network identifier of which is intended to be accepted by other access points.

Figure 5:
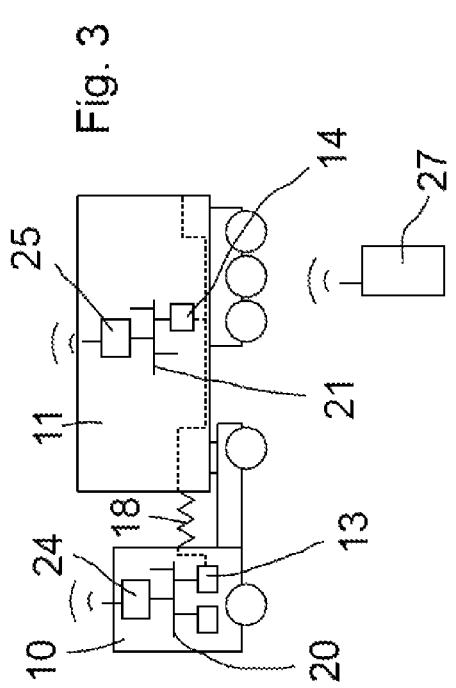

In the permanent vehicle network according to FIG. 5, the WLAN client 27 (Smartphone) can access the data present in the control units 13, 14 and the CAN buses 20, 21 via each of the two WLAN units 24, 25. It is no longer necessary for the WLAN client 27 to be connected precisely to the WLAN unit of the vehicle concerned. Instead, the data are forwarded if necessary from access point to access point through to the WLAN client.

A further trailer (the second trailer 12 in FIG. 1) can be added in the same way. The connection data of the tractor unit 10 are stored in the Smartphone. The Smartphone records the connection data of the further trailer and makes contact as a WLAN client 27 with the WLAN unit 26 and notifies the latter that it is to use the radio network identifier and the encryption of the WLAN unit 24. WLAN unit 26 is then switched off and restarted, now with the radio network identifier of the WLAN unit 24 of the tractor unit 10. The second trailer 12 has previously been connected to the first trailer 11. An authorization via the physical connection is thus also possible in the manner described.

Further trailers can thus be added gradually. A uniform vehicle network is created even if the distantly located trailers themselves have no direct radio connection to the tractor unit 10. In the network consisting of the tractor unit and a plurality of trailers, the respective access points have access to the data of their vehicle known to them and simultaneously to the data of the other access points also. All necessary vehicle data are thus available in a vehicle network for the first time in every vehicle part. New comfort functions and safety functions can be implemented.

The individual access points communicate with one another via WDS (Wireless Distribution System) in the sense of a point-to-multipoint system. Access points that are located between other access points have the function of a repeater in the network. Access points from one and the same manufacturer are typically used.

The data available on the respective CAN bus, present in the control units and supplied by connected sensors are available in the vehicle network as a data layer. The aim is to achieve a data transfer and data processing that is as vendor-independent as possible.

Communication takes place in an exclusively wireless manner in the vehicle network described. A backbone via cable is not provided. The described physical connections 18, 19 are used only for authorization in establishing the vehicle network.

What is claimed is:

1. A method for establishing a vehicle network comprising the following steps:
    a) acquiring, by a WLAN client for a mobile device, connection data of an access point of a first vehicle and connection data of an access point of a second vehicle,
    b) connecting the WLAN client to the access point of the second vehicle,
    c) transmitting, by the WLAN client, the connection data of the access point of the first vehicle to the access point of the second vehicle so that the access point of the second vehicle can accept a radio network identifier of the access point of the first vehicle and establish a connection via WDS to the access point of the first vehicle,
    d) reconfiguring the access point of the second vehicle to include the radio network identifier of the access point of the first vehicle in response to the transmission, by the WLAN client, of the connection data of the access point of the first vehicle to the access point of the second vehicle,
    e) connecting the access point of the second vehicle to the access point of the first vehicle via WDS, thus forming one single WLAN network with one single radio network identifier visible to the WLAN, wherein brake control unit data associated with the first vehicle and brake control unit data associated with the second vehicle are forwarded wirelessly between the first access point and the second access point,
    f) accessing by the WLAN client the brake control unit data associated with the first vehicle and the brake control unit data associated with the second vehicle over the single WLAN network.

2. The method as claimed in claim 1 wherein the vehicle network includes a further vehicle, and wherein said method further comprises the following steps:
    a) connecting the WLAN client to an access point of the further vehicle,
    b) transmitting, by the WLAN client, the connection data of the access point of the first vehicle to the access point of the further vehicle so that the access point of the further vehicle can accept the radio network identifier of the access point of the first vehicle and establish a connection to the access point of the first vehicle via WDS,
    c) reconfiguring the access point of the further vehicle to include the radio network identifier of the access point of the first vehicle to connect to the access point of the first vehicle via WDS, thus becoming part of the one single WLAN network visible to the WLAN client.

3. The method as claimed in claim 1, wherein the first vehicle and the second vehicle are physically interconnected, said method further comprising the step of carrying out a check following an establishment of the connection via WDS between the access point of the first vehicle and the access point of the second vehicle to determine whether signals are also transmittable between the first and second vehicles via physical lines, wherein the connection via WDS is retained only if the check is successful.

4. The method as claimed in claim 1, wherein the WLAN client loads the connection data of the access point of the first vehicle at least indirectly in a wireless manner.

5. The method as claimed in claim 4 the WLAN client loads the connection data of the access point of the first vehicle via a radio link or optically with a camera of the mobile device.

6. The method as claimed in claim 1, wherein the WLAN client loads the connection data of the access point of the first vehicle from a server and the server is accessed using data previously acquired wirelessly by the WLAN client.

* * * * *